March 12, 1957 J. J. HARLEY ET AL 2,785,217

INSTALLATION OF OVERHEAD TRANSMISSION LINES

Filed June 27, 1952 5 Sheets-Sheet 1

INVENTORS: J. J. HARLEY
T. C. HENNEBERGER
R. G. WATLING

BY [signature]
ATTORNEY

INSTALLATION OF OVERHEAD TRANSMISSION LINES

INVENTORS: J. J. HARLEY
T. C. HENNEBERGER
R. G. WATLING
BY [signature]
ATTORNEY

INSTALLATION OF OVERHEAD TRANSMISSION LINES

Filed June 27, 1952. 5 Sheets-Sheet 3

INVENTORS: J. J. HARLEY
T. C. HENNEBERGER
R. G. WATLING
BY Howard G. Hamm
ATTORNEY March 12, 1957 J. J. HARLEY ET AL 2,785,217

INSTALLATION OF OVERHEAD TRANSMISSION LINES

Filed June 27, 1952 5 Sheets-Sheet 4

INVENTORS: J. J. HARLEY
T. C. HENNEBERGER
R. G. WATLING
BY
ATTORNEY

March 12, 1957 J. J. HARLEY ET AL 2,785,217

INSTALLATION OF OVERHEAD TRANSMISSION LINES

Filed June 27, 1952 5 Sheets-Sheet 5

INVENTORS: J. J. HARLEY
T. C. HENNEBERGER
R. G. WATLING

BY Howard A. Hamm
ATTORNEY

United States Patent Office 2,785,217
Patented Mar. 12, 1957

2,785,217

INSTALLATION OF OVERHEAD TRANSMISSION LINES

Joseph J. Harley, Summit, Thomas C. Henneberger, Madison, and Robert G. Watling, Morristown, N. J., assignors to Bell Telephone Laboratories, Incorporated, New York, N. Y., a corporation of New York Application June 27, 1952, Serial No. 296,034

2 Claims. (Cl. 174—40)

This invention relates to the installation of overhead transmission lines and more particularly to the installation by workmen on the ground, of electrical conductors intended for the transmission of intelligence.

The present and approved method of installing open wire telephone transmission lines, is to install a full size pole, that is one having a fairly large diameter, say about from 8 inches to 12 inches at the butt end, and having a height of approximately 30 feet. In using poles of this size it is often necessary that the cross-arms which support the insulators and the other fixtures, which are attached thereto, be secured to the top of the pole by a workman climbing the pole. This, in itself, is a time-consuming and costly operation and adds quite materially to the installation cost of an open wire line. It is the practice, after the cross-arms or other fixtures have been secured in place, to position the insulators thereon and then pull in the transmission wires or conductors over the supports in lengths of approximately one-third of a mile.

After the wires have been pulled in and are suitably transposed, where transpositions are required, they are dead ended, tensioned and secured to the insulators by suitable tie wires. It is obvious that this is a time-consuming operation since it necessitates the workmen climbing up and down the pole a number of times. While this expense can be justified in the installation of toll lines, carrier lines, and other types of urban lines where a large number of stations are accommodated, the expense is not justifiable where a long line must be installed to provide telephone service for a single subscriber or even a small number of subscribers. Confronted with the problem of providing cheap and adequate telephone service to rural and outlying districts and also having in mind the installation of a dependable trouble-free system which would be particularly adaptable, but not necessarily limited, to rural use and one which could be installed with a minimum amount of time and effort and by using methods and apparatus particularly adaptable for such a line, the applicants have devised new techniques together with new equipment and new wire supporting devices, all of which cooperate to permit an entire pole line to be installed and the wires tensioned and secured in their supports, solely from the ground and which obviates entirely the necessity for any pole climbing by the workmen. Also by the installation of fairly light-weight poles, which may be erected by a crew of two men, the ease and speed of such an installation is readily apparent.

It is obvious that such a method of installing an overhead open wire transmission line, which will hereinafter be described in detail will be particularly advantageous in cases, for example in military operations, where the speed of installation of a communication line is of major importance. By the use of the apparatus and the method described herein a communication line can be set up in the field of operation with less hazard to the men and with a minimum amount of time and labor.

A principal object of the present invention is the provision of an open wire telephone transmission line which may be completely installed from the ground thereby obviating the necessity of workmen climbing poles.

Another object of the invention is the provision of a novel combined insulator and wire supporting clamp which suspends and secures the wires from the underside of the cross-arm.

A further object of the invention is the provision of a combined insulator and wire clamping unit wherein the wire is positioned and secured in place from the ground by means of suitable tools cooperating with the clamping unit.

A still further object of the invention is the provision of a combined insulator and wire securing clamp in which the means for securing the wire in place and which prevents longitudinal movement thereof, holds the wire securely and does not injure or impair the wire at the point of contact.

The present invention contemplates the installation of an overhead open wire transmission line by securing to the top of the poles, before they are erected, suitable cross-arms or other insulator supporting fixtures to which downwardly depending combined insulators and wire clamping units are secured, erecting the poles in an expeditious manner, for example, by the use of power equipment, and then positioning and securing the wires in the insulator and wire clamping units by the use of a tool designed to facilitate the placing of the wire and the tightening of the clamp.

The invention will be more clearly understood from the following detailed description when read in connection with the following drawings of which:

Figure 1:
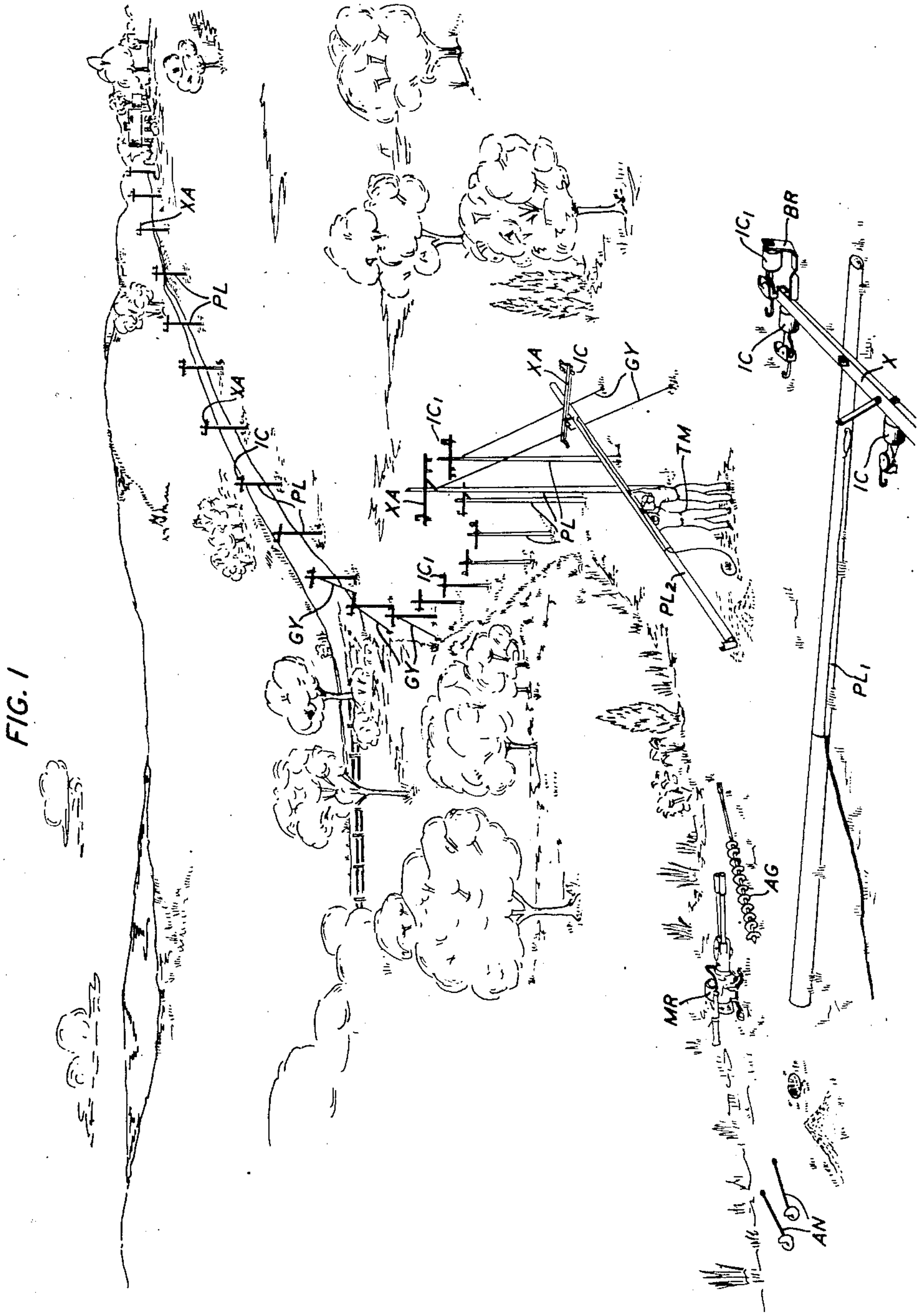
Fig. 1 is a panoramic view showing a typical open wire transmission line installation constructed in accordance with this invention and illustrates a number of poles set in position, a pole being erected, and a pole lying on the ground with the cross-arm and insulator and wire clamping units attached thereto.

As shown in Fig. 1, the first step in the installation of an overhead open wire transmission line is the securing of the cross-arms XA to the poles PL, and boring suitable holes in the ground to receive the poles. This may be effected through equipment which comprises the earth auger AG and the power driven device MR therefor. By the use of the mechanized equipment shown a hole substantially the size of the pole butt is bored thereby providing a setting for the pole which requires little back filling and makes for a strong pole setting due to the small amount of disturbed earth. It is therefore only necessary to provide guys GY at certain specific points, for example, at corners or curves in the pole line as shown. In those instances where guys are required only light guys are needed and small screw type anchors are used. These anchors are shown at AM and are screwed into the earth by means of the power device MR.

As shown in Fig. 1, the pole $PL_1$ is lying on the ground with the cross-arm secured to the top thereof with the combined insulator and wire clamping units IC—IC secured thereto and downwardly depending therefrom, and the transposition bracket BR in place on top of the cross-arm XA, with the combined insulator and wire clamping unit IC, in place. As shown in this figure, pole $PL_2$ is being set in position by the team of workmen TM.

Figure 2:
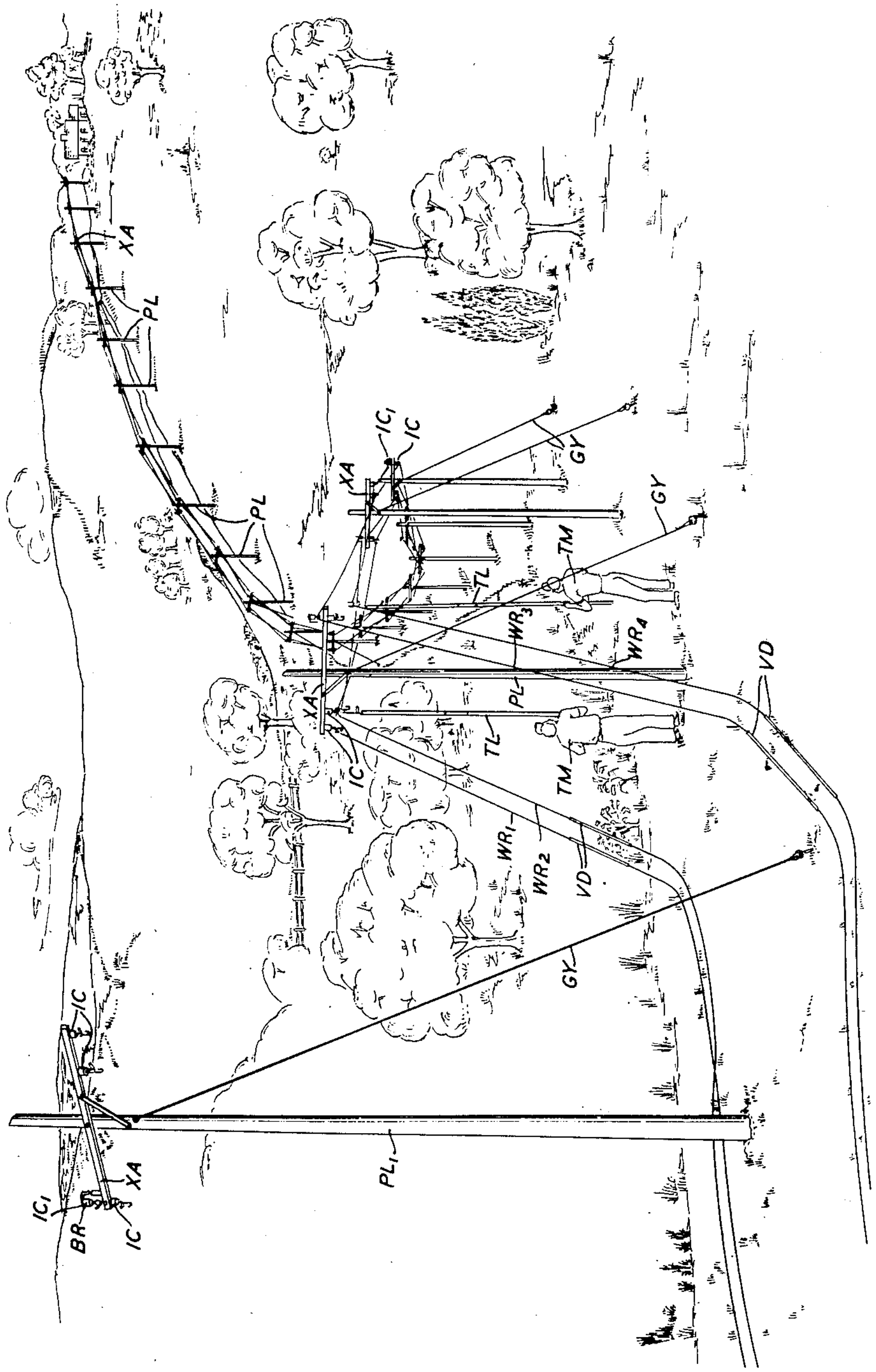
Fig. 2 is a view similar to Fig. 1 but shows the wires in a number of spans in position in the insulator and wire clamping units with the necessary transpositions thrown in and two men positioning the wires in the insulator and wire clamping units with a portion of the line wires lying on the ground awaiting installation by the workmen.

In Fig. 2 the poles PL, $PL_1$ and $PL_2$ have all been set and properly guyed as heretofore described and the line wires $WR_1$, $WR_2$ of one pair and $WR_3$ and $WR_4$ of the other pair have been transposed, raised and positioned in the clamps of the combined insulators and clamping devices IC—IC and $IC_1$.

In Fig. 2 the team of workmen TM—TM are placing the wires $WR_1$, $WR_2$, $WR_3$, $WR_4$, which have vibration dampers VD—VD installed thereon, in position by means of suitable tools TL—TL which will hereinafter be described in detail.

Figure 3:
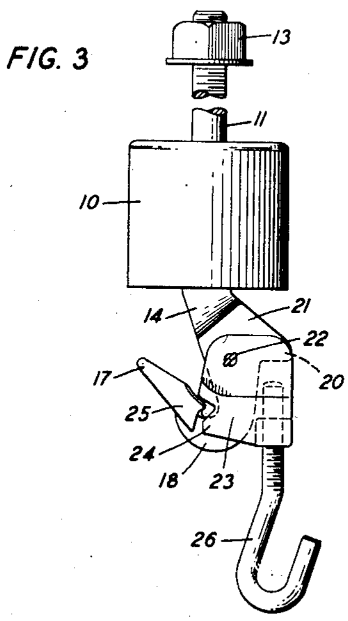
Fig. 3 is a side elevational view of the preferred combined insulator and wire clamping unit constructed in accordance with this invention.
Figure 4:
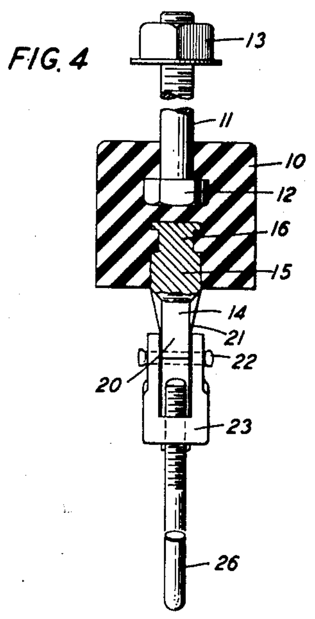
Fig. 4 is a rear elevational view, partly in section, of the insulator and wire clamping unit shown in Fig. 3.
Figures 5, 8:
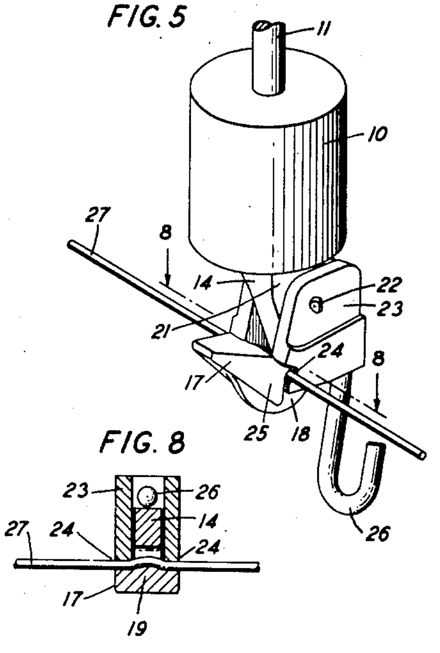
Fig. 5 is a view in perspective of the device shown in Figs. 3 and 4 with a fragment of line wire positioned in the jaws of the clamp.
Fig. 8 is a fragmentary view, partly in section, taken on line 8—8 of Fig. 5.

In order to facilitate the installation of the wires from the ground and provide proper insulation of the wires, and to securely hold them under tension a novel type of combined insulator and clamping device as shown in Figs. 3, 4, and 5, is employed. As shown in these figures, the preferred form of combined insulator and clamping unit comprises a body 10 of tough insulating material, for example, a thermoplastic, having embedded therein adjacent to and extending from its upper surface a threaded bolt member 11, the head 12 of which is intimately embraced by the molding material of the body member 10. The upper or extending end of the bolt 11 is threaded and is provided with a suitable nut 13 for securing it to a support. Embedded in the body member 10 and spaced some distance from the head 12 of the bolt member 11, is the downwardly extending hook member 14. The embedded or shank end 15 of member 14 is provided with a reduced diameter portion 16 to permit the insulating material to flow therearound and obtain a firm grip thereon. The free end of the hook member 14 is provided with an upwardly extending bill portion 17 which has a substantially greater cross sectional area than the rest of the hook and is of greater width than the return bend portion 18 of the hook. This enlarged bill portion of the hook extends above the surface of the return bend portion 18 to provide a substantially wide wire receiving seat. Centrally disposed equidistant with respect to the ends of the wire receiving seat, is an embossment 19 as shown in Fig. 8. As shown at 20 there is provided at the rear of the hook member 14 an extending ear or boss, the purpose of which will be described later.

Pivotally mounted on the flat shank portion 21 of the hook 14, by means of the pin 22, is a bifurcated yoke member 23 having extending leg portions. The pin 22 is located adjacent the upper portion of the yoke so that the yoke of its own weight will assume a downwardly depending position with the notched portions 24—24 on the legs of the yoke 23, bearing against the raised portions 25—25 of the bill seat on each side of the embossing 19 to provide a pair of wire receiving or clamping jaws as shown in Fig. 8.

Threadedly mounted at the lower portion of the yoke 23, equidistant between the legs of the yoke and in alignment with the boss 20, is the downwardly depending threaded hook member 26. The hook member 26 when turned clockwise is caused to rise upwardly and have its threaded end engaged by the boss 20. This causes the yoke 23 to be moved over toward the bill portion of the hook and causes the notched portions 24—24 on the yoke to move toward the seat of the bill 17 and force the wire 27, located therein, against the embossing 19 and secure the wire therein as shown in Figs. 5 and 8.

Figures 6, 7:
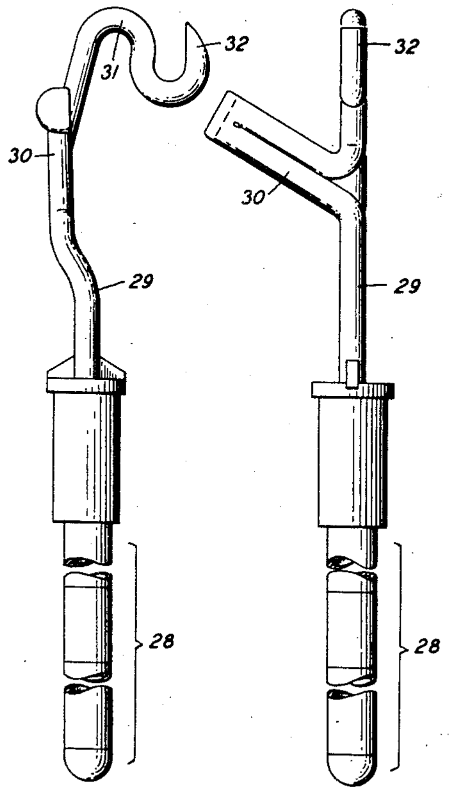
Fig. 6 is a front elevational view of a tool for positioning and securing the wire in the combined insulator and wire clamping unit.
Fig. 7 is a side elevational view of the tool shown in Fig. 6.
Figure 9:
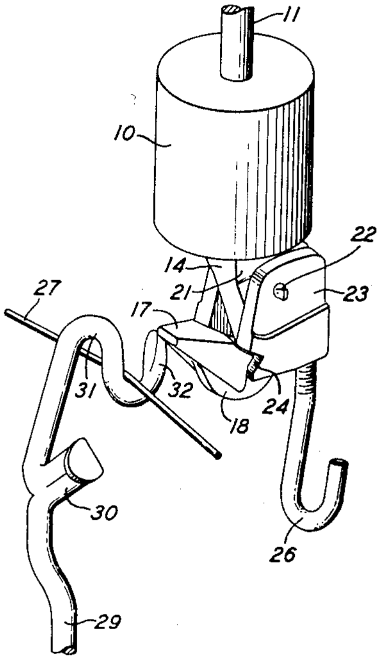
Fig. 9 is a view in perspective of the insulator and wire clamping unit shown in Fig. 3, with the clamp jaws open and the wire about to be positioned therein by means of the tool shown in Figs. 6 and 7.

As shown in Fig. 9, the hook 26 has been unscrewed or turned counterclockwise a sufficient amount to permit the notched portions 24—24 on the yoke member 23 to be swung out of contact with the seat of the bill 17 when the wire 27 is being positioned over the bill 17 of the hook 14 by means of the tool shown in Figs. 6 and 7. As shown in Fig. 9, the wire 27 is in position on the hook of the tool and is ready to be lifted over the bill of the hook 14, force the yoke 23 rearward and permit the wire 27 to assume a position between the seat of the bill 17 and the notches 24—24 in the legs of the yoke 23 as shown in Fig. 10.

Figure 10:
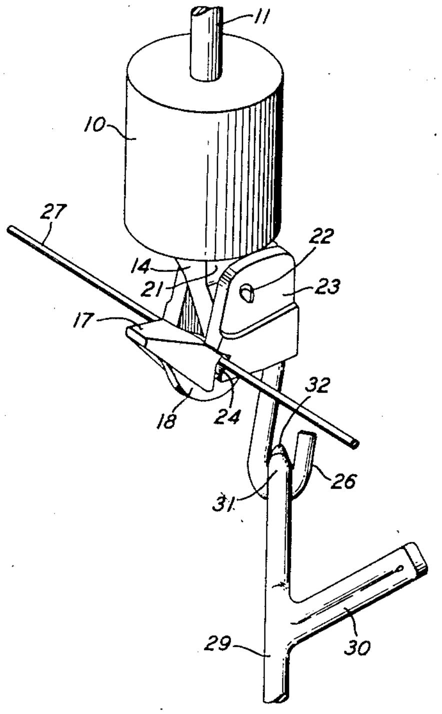
Fig. 10 is a view similar to Fig. 9 but shows the wire in place in the clamping jaws and the clamp being tightened by means of the tool shown in Figs. 6 and 7.

After the wire 27 has been positioned as shown in Fig. 10, it is secured by turning the hook 26 clockwise. This causes the end of the threaded portion of the hook 26 to engage the boss 20 on the hook 14 and force the notched portions 24—24 on the legs of the yoke 23 toward the seat of the bill 17, thereby tightly gripping the wire 27 therebetween. Continued rotation of the hook 26 causes the deformation of the wire 27 between the legs of the yoke 23 due to the embossing 19 thus preventing movement of the wire 27, as shown in Fig. 8.

Figure 11:
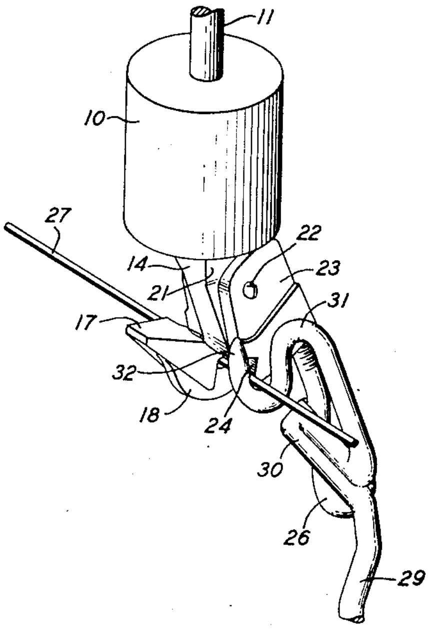
Fig. 11 is a view similar to Figs. 9 and 10 but shows the clamping jaws opened and the wires being removed therefrom by means of the tool shown in Figs. 6 and 7.

When it is desired to remove the wire 27 from its support the hook 26 is unscrewed by means of the tool shown in Figs. 6 and 7 until the yoke 23 is free to swing away from the bill 14. The tool is then used to move the yoke 23 away from the bill and lift the wire out as shown in Fig. 11.

Figure 12:
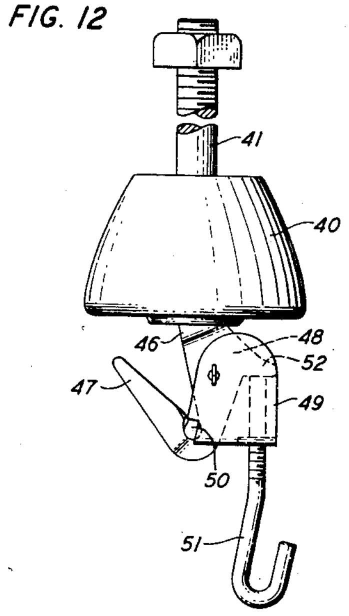
Fig. 12 is a side elevational view of another insulator and wire clamping unit illustrative of this invention.
Figure 13:
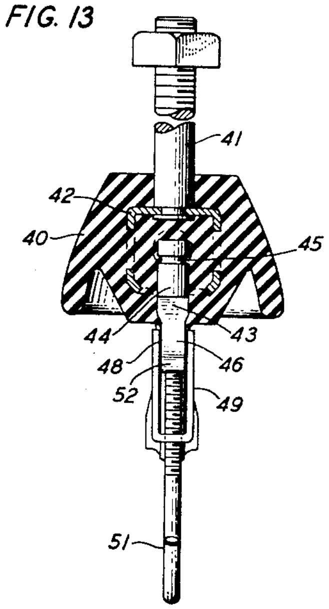
Fig. 13 is a rear elevational view, partly in section, of the insulator and wire clamp shown in Fig. 12 and illustrates the petticoat construction of the insulator and the manner of securing the metal components therein; and, Fig. 14 is a side elevational view of a fragment of a cross-arm with the insulator and wire clamping unit secured thereto.
Figure 14:
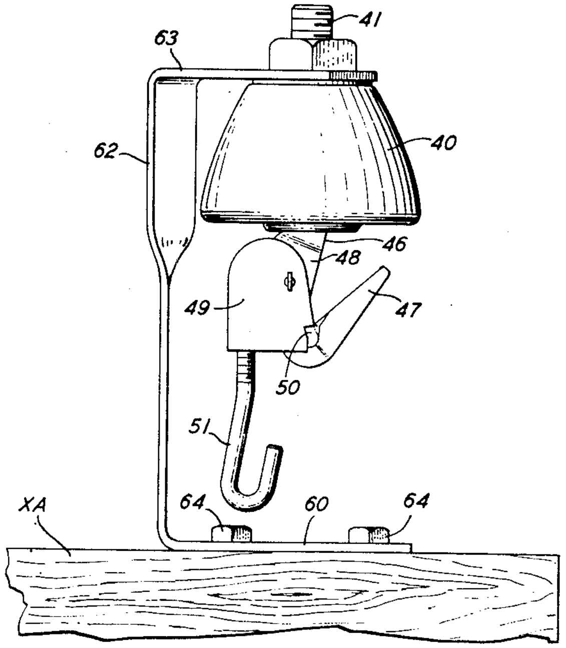

In the combined insulator and wire clamping unit as shown in Figs. 12, 13 and 14, the body portion 40 which is constructed of tough insulating material, for example a thermoplastic, is substantially conical in configuration and is provided with a suitable petticoat to provide a long leakage path. As in the structure of the combined insulator and clamping unit shown in Figs. 3, 4, and 5, as heretofore described, an upwardly extending bolt member 41 is provided for securing the device to a suitable support. The bolt 41 is embedded in the body 40 and is provided on its embedded end with an apertured or perforated cup member 42, firmly secured thereto. As shown, the downwardly extending rim of the cup member 42 is bent inwardly to increase the holding power of the unit and to permit the insulating material to flow around the cup and intimately embrace it.

There is also embedded in the body 40 a downwardly depending hook member 43, the shank or inner end portion of which has a reduced diameter section 45. The inner end 44 of the hook 43 is centrally disposed, as shown, within the cup member 42, but separated therefrom by the insulating material which extends downwardly a slight distance below the petticoat of the body 40.

The downwardly extending hook member 43 is constructed substantially the same and functions in the same manner as the device shown in Figs. 3, 4, and 5, and comprises a downwardly depending hook member 46 having an integral bill portion 47 and a flattened shank portion 48. A bifurcated yoke member 49 is pivotally supported on the flat portion of the shank 48 and is adapted to have its notched lower leg portions 50—50 engage the seat of the bill 47 when the threaded hook member 51 is turned clockwise and into engagement with the boss 52 in a manner as heretofore described with reference to the operation of the combined insulator and wire clamping device shown in Figs. 3, 4, and 5.

When it is desirable or necessary to support the line wires above the cross-arm or support to effect transpositions, a bracket as shown in Fig. 14 is provided. This bracket is preferably constructed of metal, comprises a base portion 60, an upstanding right angle portion 61 which is twisted as at 62 to properly position the combined insulator and clamping unit which in turn is secured to the extending arm portion 63 which is integral with the upstanding portion 61. The support may be secured to a cross-arm such as XA or to any other suitable support by means of bolts 64—64.

While we have shown and described preferred embodiments of our invention it is to be understood that various changes and modifications may be made therein without departing from the spirit of the invention.

What is claimed is:

1. A combined insulator and wire clamp unit for overhead electrical transmission lines comprising a body of insulating material, means embedded in said body and extending above the upper surface thereof for securing said unit to a support, wire clamping means also embedded in said body and extending downwardly below the lower surface thereof, said clamping means comprising a hook having a flat shank portion, and an enlarged upwardly extending bill, said bill having a width greater than said shank and provided at its return bend portion with a substantially wide wire receiving seat, a shoulder on said shank to the rear of said hook, a downwardly depending yoke member pivotally supported on the flat shank portion of the hook between said bill and said shoulder, said yoke having jaw portions on each side of said hook cooperating with the wire receiving seat on said bill to grip a wire therebetween and threaded means on said yoke in engagement with the shoulder on said shank for forcing said yoke toward said wire receiving seat.

2. A combined insulator and wire clamp unit for over head electrical transmission lines comprising a body of insulating material, means embedded in said body and extending above the upper surface thereof for securing said unit to a support, wire clamping means also embedded in said body and extending downwardly below the lower surface thereof, said clamping means comprising a hook having a flat shank portion, and an enlarged upwardly extending bill having an inclined inner surface, said bill having a width greater than said shank, provided at its return bend portion with a substantially wide wire receiving seat, and having a wire embracing embossment thereon, a shoulder on said shank to the rear of said hook, a downwardly depending yoke member pivotally supported on the flat shank portion of the hook between said bill and said shoulder, said yoke having jaw portions on each side of said hook cooperating with the wire receiving seat on said bill to grip a wire therebetween and threaded means on said yoke in engagement with the shoulder on said shank for forcing said yoke toward said wire receiving seat.

References Cited in the file of this patent

UNITED STATES PATENTS

| | | |
|---|---|---|
| 960,827 | Conway et al. | June 7, 1910 |
| 1,022,993 | Willis | Apr. 9, 1912 |
| 2,181,802 | Faires et al. | Nov. 28, 1939 |
| 2,450,730 | Hord | Oct. 5, 1948 |
| 2,699,462 | Exner | Jan. 11, 1955 |

FOREIGN PATENTS

| | | |
|---|---|---|
| 345,676 | Germany | May 20, 1920 |
| 420,398 | Great Britain | Nov. 30, 1934 |

OTHER REFERENCES

Tips Tool Co. Catalog No. 6, December 1933, page 74. 339–1.09. Copy available in 173–273.3 UX.

Publication II Tips Tool Co. Catalog No. G3620, page 74, received May 22, 1934. Copy in 339–109.